(12) United States Patent
Park (10) Patent No.: US 9,575,241 B2
(45) Date of Patent: Feb. 21, 2017

(54) TILED DISPLAY

(71) Applicant: Samsung Display Co., Ltd., Yongin, Gyeonggi-Do (KR)

(72) Inventor: Kyung Tea Park, Seoul (KR)

(73) Assignee: Samsung Display Co., Ltd. (KR)

( * ) Notice: Subject to any disclaimer, the term of this patent is extended or adjusted under 35 U.S.C. 154(b) by 49 days.

(21) Appl. No.: 14/749,190

(22) Filed: Jun. 24, 2015

(65) Prior Publication Data

US 2016/0238785 A1   Aug. 18, 2016

(30) Foreign Application Priority Data

Feb. 13, 2015  (KR) ........................ 10-2015-0022406

(51) Int. Cl.
*G02B 6/06* (2006.01)
*F21V 8/00* (2006.01)

(52) U.S. Cl.
CPC ........... *G02B 6/0076* (2013.01); *G02B 6/0068* (2013.01)

(58) Field of Classification Search
None
See application file for complete search history.

(56) References Cited

U.S. PATENT DOCUMENTS

| | | | | |
|---|---|---|---|---|
| 6,069,740 | A * | 5/2000 | Hamanaka | G02B 3/0031 359/620 |
| 6,304,703 | B1 * | 10/2001 | Lowry | G02B 6/06 345/32 |
| 6,307,995 | B1 * | 10/2001 | Veligdan | G02B 6/0033 385/129 |
| 6,927,908 | B2 | 8/2005 | Stark | |
| 8,294,869 | B2 * | 10/2012 | Yamaguchi | G02F 1/133305 349/158 |
| 9,069,128 | B2 * | 6/2015 | Kuroda | G02B 6/1221 |
| 9,231,221 | B2 * | 1/2016 | Naijo | H01L 51/0097 |
| 2003/0213956 | A1 * | 11/2003 | Hioki | G02F 1/133305 257/59 |
| 2010/0200736 | A1 * | 8/2010 | Laycock | G02B 6/06 250/227.2 |
| 2012/0114284 | A1 * | 5/2012 | Ender | G02B 6/0018 385/32 |
| 2015/0298443 | A1 * | 10/2015 | Hundley | B32B 38/1866 156/214 |

FOREIGN PATENT DOCUMENTS

| | | |
|---|---|---|
| JP | 2011-047976 A | 3/2011 |
| KR | 10-0741970 | 7/2007 |
| KR | 10-2011-0018212 A | 2/2011 |
| KR | 10-1217554 | 12/2012 |
| KR | 10-2013-0007311 A | 1/2013 |
| KR | 10-2014-0068626 A | 6/2014 |

\* cited by examiner

*Primary Examiner* — Tina Wong
(74) *Attorney, Agent, or Firm* — Innovation Counsel LLP (57) ABSTRACT

A tiled display is disclosed herein. The tiled display includes: a plurality of unit display units, wherein each of the unit display units includes: a panel assembly including a curved surface part of which both ends are curved surfaces; a light transmitting member disposed in a transparent plate shape and covering the curved surface part of the panel assembly; and a light guide member including a recess part recessed at one side thereof where the light guide member is combined with the light transmitting member, positioned adjacent to the curved surface part of the panel assembly, and positioned toward a direction in which an image is displayed from the panel assembly.

9 Claims, 7 Drawing Sheets

TILED DISPLAY

CROSS-REFERENCE TO RELATED APPLICATION

This application claims priority to and the benefit of Korean Patent Application No. 10-2015-0022406 filed in the Korean Intellectual Property Office on Feb. 13, 2015, the entire contents of which are incorporated herein by reference.

BACKGROUND (a) Field of the Disclosure

This disclosure relates to a tiled display.

(b) Description of the Related Art

A flat panel display, such as a liquid crystal display (LCD), an organic light emitting diode (OLED) display, an electrophoretic display, a plasma display, or the like, generally includes a plurality of pairs of electric field generating electrodes and an electro-optical active layer disposed between the plurality of pairs of electric field generating electrodes. The liquid crystal display includes a liquid crystal layer as an electro-optical active layer, and the organic light emitting diode display includes an organic emission layer as an electro-optical active layer. One of a pair of electric field generating electrodes is generally connected to a switching element to receive an electrical signal when the switching element is turned on, and the electro-optical active layer converts the electrical signal into an optical signal to display an image.

Recently, a tiled display in which a plurality of displays are connected to each other to manufacture a large screen display has been used, such as for outdoor advertising, or the like. The tiled display implements a large screen by fixing a plurality of display panels having a predetermined size to a mounting frame. However, because each of the display panels has a visible bezel positioned at a boundary portion around its display area, the display quality of the tiled display as a whole is deteriorated.

The above information disclosed in this Background section is only for enhancement of understanding of the background of the present system and method and therefore may contain information that does not form the prior art that is already known in this country to a person of ordinary skill in the art.

SUMMARY

An exemplary embodiment of the present system and method provides a tiled display having advantages of reducing the visibility of a bezel.

An exemplary embodiment of the present system and method provides a tiled display including: a plurality of unit display units, wherein each of the unit display units includes: a panel assembly including a curved surface part of which both ends are curved surfaces; a light transmitting member formed in a transparent plate shape and covering the curved surface part of the panel assembly; and a light guide member including a recess part recessed at one side thereof where the light guide member is combined with the light transmitting member, positioned adjacent to the curved surface part of the panel assembly, and positioned toward a direction in which an image is displayed from the panel assembly.

The light guide member may have a plurality of light guide layers stacked therein, each of the light guide layers including: a light transmitting layer transferring light output from the panel assembly; and a reflecting layer formed on one surface of the light transmitting layer to reflect the light transferred by the light transmitting layer.

The light guide member may include a plurality of first adhering layers interposed between the light transmitting layer and the reflecting layer.

The light guide member may include a plurality of second adhering layers interposed between two light guide layers adjacent to each other among the plurality of light guide layers so as to adhere the plurality of light guide layers to each other.

The panel assembly may include a plurality of pixels, and a thickness of the light transmitting layer may correspond to a width of a pixel.

The plurality of pixels may be disposed on the curved surface part of the panel assembly.

Each of the plurality of light guide layers may have one end positioned adjacent to a pixel of the panel assembly and another end directed toward the direction in which the image is displayed from the panel assembly.

A radius of curvature of the recess part may be equal to that of the curved surface part of the tiled display.

The unit display unit may further include: a window member formed in a transparent plate shape and covering parts other than the curved surface part in the panel assembly.

In the tiled display according to an exemplary embodiment of the present system and method, the image may be displayed from the curved surface part to an end portion of the panel assembly, and the image display from the curved surface part of the panel assembly may be displayed to an upper surface of the unit display unit along the light guide member. Therefore, the image may be displayed to the entirety of the upper surface of the unit display unit.

Therefore, in the case in which two adjacent unit display units closely adhere to each other, visibility of a bezel is minimized, and as a result, the adjacent unit display units may appear as one panel.

BRIEF DESCRIPTION OF THE DRAWINGS

FIGS. 4 to 6 are views showing an example of a method of manufacturing the light guide member shown in FIG. 2.

DETAILED DESCRIPTION OF THE EMBODIMENTS

Hereinafter, exemplary embodiments of the present system and method are described in detail with reference to the accompanying drawings so that those of ordinary skill in the art to which the present system and method pertain may easily practice the present system and method. However, the present system and method may be implemented in various different forms and is not limited to the exemplary embodiments provided herein.

Portions unrelated to the description are omitted to more clearly describe the present system and method. Similar components are denoted by the same reference numerals throughout the present specification.

In addition, in several exemplary embodiments, components having the same configuration are representatively described using the same reference numerals in an exemplary embodiment, and only components different from those of the exemplary embodiment are described in the other exemplary embodiments.

Throughout the present specification, when a part is referred to as being "connected to" another part, the part and another part may be "directly connected to" each other or "indirectly connected to" each other with one or more intervening parts interposed therebetween. In addition, throughout the present specification, unless explicitly described to the contrary, the word "comprise" and its variations, such as "comprises" or "comprising", imply the inclusion of stated elements but not the exclusion of other elements.

Figure 1:
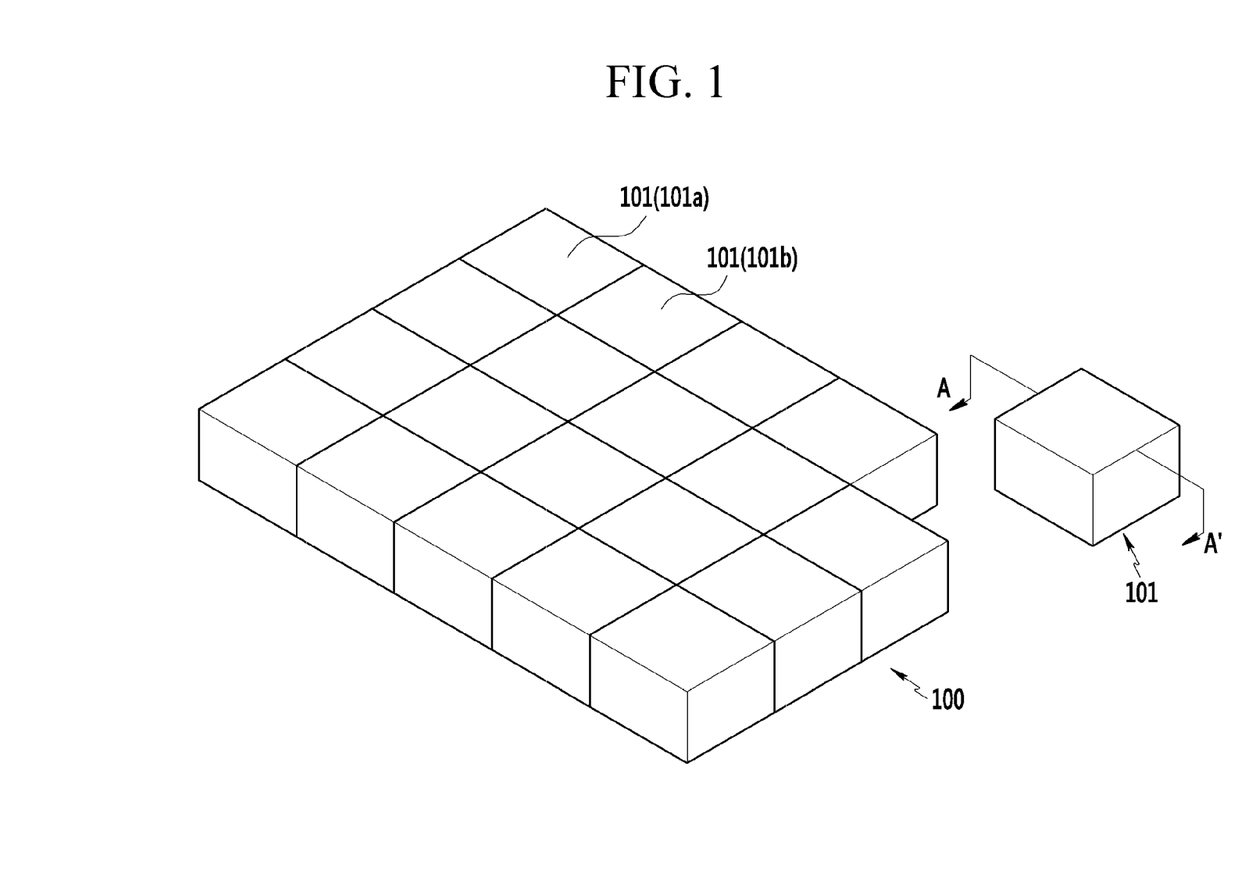
FIG. 1 is a perspective view showing a tiled display according to an exemplary embodiment of the present system and method.
Figure 2:
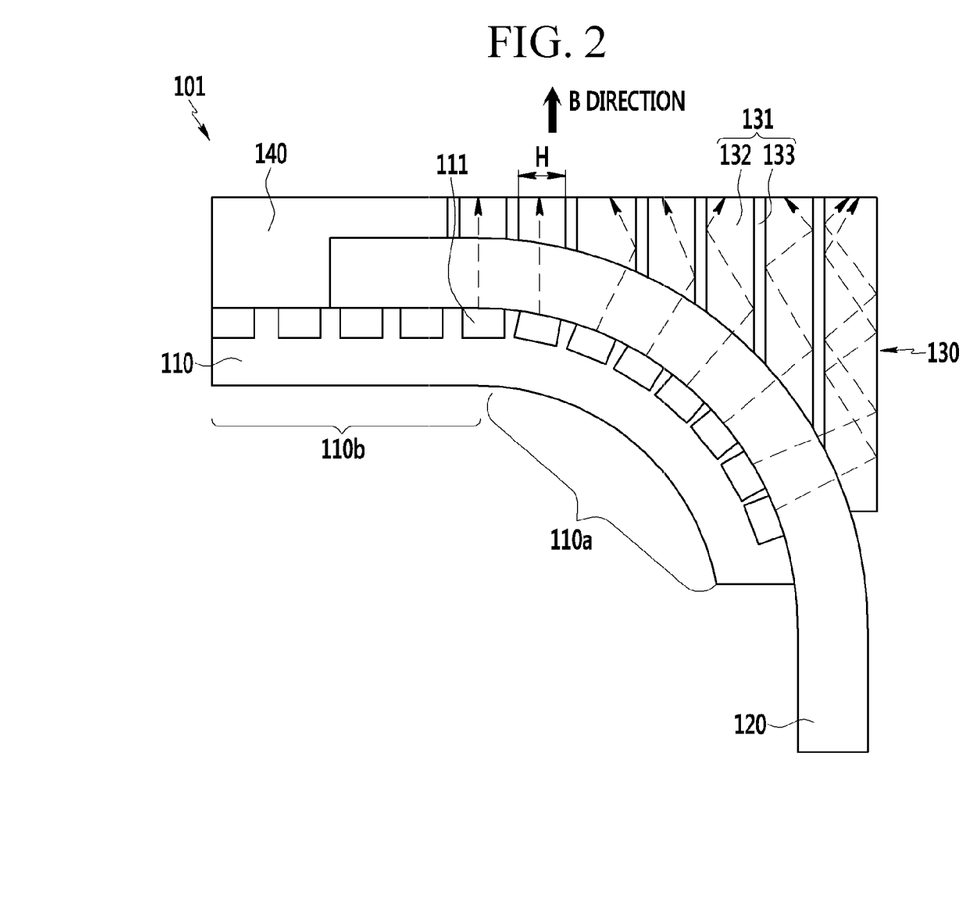
FIG. 2 is a cross-sectional view of one panel assembly included in the tiled display shown in FIG. 1, taken along line A-A'.

FIG. 1 is a perspective view showing a tiled display according to an exemplary embodiment of the present system and method. FIG. 2 is a cross-sectional view of one panel assembly included in the tiled display shown in FIG. 1, taken along line A-A'.

Referring to FIGS. 1 and 2, the tiled display 100 according to an exemplary embodiment of the present system and method may include a plurality of unit display units 101. As shown in FIG. 1, five unit display units 101 may be arranged in left and right directions in a row, and four rows of display units 101 may be arranged in front and rear directions. That is, a total of twenty unit display units 101 may be arranged. An arrangement of the unit display units 101 may be changed depending on design.

The unit display unit 101 includes a panel assembly 110, a light transmitting member 120, and a light guide member 130.

The panel assembly 110 includes a curved surface part 110a of which both ends are curved surfaces. The panel assembly 110 may be, for example, a flexible display. The flexible display is a display panel that may be bent. Therefore, both ends of the panel assembly 110 may be bent. For example, the panel assembly 110 may be formed such that its center portion has a flat planar surface and both ends of the panel assembly 110 may be bent with respect to the flat planar surface of the center portion by 90 degrees.

Meanwhile, the panel assembly 110 may have a chassis (not shown), a driving chip (not shown), or the like, formed at one side thereof. The chassis may be a member to which the panel assembly 110 is fixed. The driving chip may include, for example, a driving chip for gate lines and a driving chip for data lines.

In the tiled display 100 according to an exemplary embodiment of the present system and method, the plurality of unit display units 101 may closely adhere to each other or may be coupled to each other by a separate coupling means. Each of the unit display units 101 may display different images respectively. Alternatively, one display image may be separated into several images that are each displayed by a respective unit display unit 101.

Meanwhile, the unit display unit 101 may optionally further include a touch sensor (not shown). Here, the touch sensor may be disposed on the panel assembly 110. For example, a capacitive touch panel may be used as the touch sensor. However, the touch sensor is not limited to the capacitive touch panel, but may be any touch panel that recognizes a touch of a user.

The light transmitting member 120 may be disposed in a transparent plate shape and cover the curved surface part 110a of the panel assembly 110. A material of the light transmitting member 120 may be, for example, a plastic or a glass. For example, the plastic may include one or more of various kinds of resins such as polyethylene terephthalate (PET), poly carbonate (PC), poly methyl meth acrylate (PMMA), and the like.

The light transmitting member 120 and the panel assembly 110 may adhere to each other by an optical transparent tape or adhere to each other by an adhesive material. The light transmitting member 120 as described above protects the curved surface part 110a of the panel assembly 110 from the outside.

Figure 6:
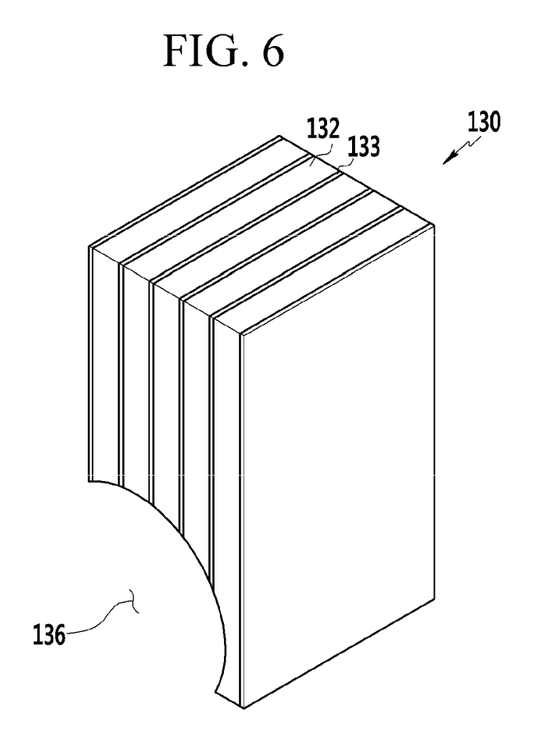
FIG. 6 is a view showing the light guide member polished and completely processed by the polishing machine.

The light guide member 130 may include a recess part 136, such as shown in FIG. 6. The recess part 136 is recessed at one side of the light guide member 130 where it is to be combined with the light transmitting member 120. That is, the recess part 136 may have a shape that is the same as that of an outer surface of the light transmitting member 120. Here, a radius of curvature of the recess part 136 is equal to that of the light transmitting member 120.

The light guide member 130 may be positioned adjacent to the curved surface part 110a of the tiled display 100 and be positioned toward a B direction in which the image is displayed from the panel assembly 110. For example, as shown in FIG. 2, when the image is displayed upwardly from the panel assembly 110, the light guide member 130 may be positioned at an upper side of the panel assembly 110. That is, the image display from the curved surface part 110a of the panel assembly 110 may be incident to a lower side of the light guide member 130 and be then displayed to an upper side of the light guide member 130.

Figure 3:
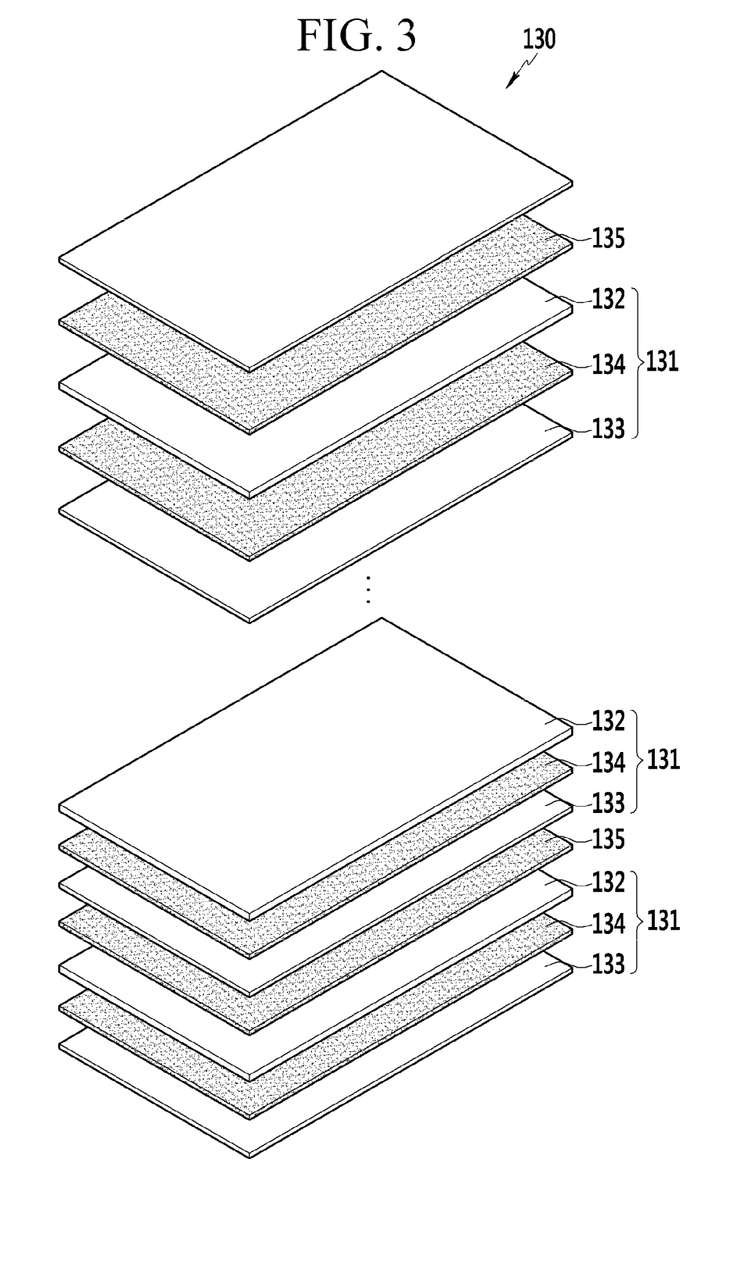
FIG. 3 is an exploded perspective view showing light guide layers configuring a light guide member shown in FIG. 2.

FIG. 3 is an exploded perspective view showing light guide layers configuring a light guide member shown in FIG. 2.

Referring to FIG. 3, the structure of the light guide member 130 described above may be formed by stacking, for example, a plurality of light guide layers 131.

Here, a detailed structure of the light guide layer 131 may include, for example, a light transmitting layer 132 and a reflecting layer 133.

The light transmitting layer 132 transfers light output from the panel assembly 110. The light (image) output from the panel assembly 110 may be transferred to an outer surface of the light guide member 130 along the light transmitting layer 132.

The panel assembly 110 may include a plurality of pixels 111. Here, a thickness H of the light transmitting layer 132 may correspond to a width of a pixel 111.

Meanwhile, the plurality of pixels 111 included in the panel assembly 110 in the tiled display 100 according to an exemplary embodiment of the present system and method may be disposed on the curved surface part 110a of the panel assembly 110, as wells as on a planar surface part 110b of the panel assembly 110. That is, the plurality of pixels 111 may be disposed over the entirety of an upper surface of the panel assembly 110. Light output from the pixel 111 of the curved surface part 110a may be transferred to the outside along the light guide layer 131 by the structure as described above.

The reflecting layer 133 is disposed on one surface of the light transmitting layer 132 to reflect the light being transmitted by the light transmitting layer 132. The reflecting layer 133 may be, for example, a reflecting film. As another example, the reflecting layer 133 may be formed by coating aluminum onto one surface of the light transmitting layer 132, but the present system and method are not limited thereto.

The reflecting layer 133 allows the light to be transferred within one light transmitting layer 132. That is, the reflecting layer 133 may reflect all incident light so that the light to be stably transferred within the light transmitting layer 132. In addition, the reflecting layer 133 may block light incident to one light transmitting layer 132 from being transferred to an adjacent light transmitting layer 132.

Meanwhile, one end of each of a plurality of light guide layers 131 may be positioned adjacent to a pixel 111 of the panel assembly 110. In addition, the other end of each of the light guide layers 131 may be directed toward the B direction in which the image is displayed from the panel assembly 110.

For example, in the case in which the panel assembly 110 is disposed to extend in the left and right directions, the plurality of light guide layers 131 may be disposed to extend in the up and down directions intersecting with the panel assembly 110.

Meanwhile, the light guide member 130 described above may include a first adhering layer 134. The first adhering layer 134 may be interposed between the light transmitting layer 132 and the reflecting layer 133. The first adhering layer 134 may adhere the light transmitting layer 132 and the reflecting layer 133 to each other. The first adhering layer 134 may be, for example, an adhering film. Alternatively, the first adhering layer 134 may be formed by applying an adhesive material onto the light transmitting layer 132 or the reflecting layer 133.

Meanwhile, the light guide member 130 may include a second adhering layer 135. The second adhering layer 135 may be interposed between two light guide layers 131 adjacent to each other among the plurality of light guide layers 131 to adhere the plurality of light guide layers 131 to each other. The second adhering layer 135 may be, for example, an adhering film. Alternatively, the second adhering layer 135 may be formed by applying an adhesive material onto the light guide layer 131.

Next, an example of a method of manufacturing the light guide member 130 having the structure described above is described in detail with reference to the accompanying drawings.

Figure 4:
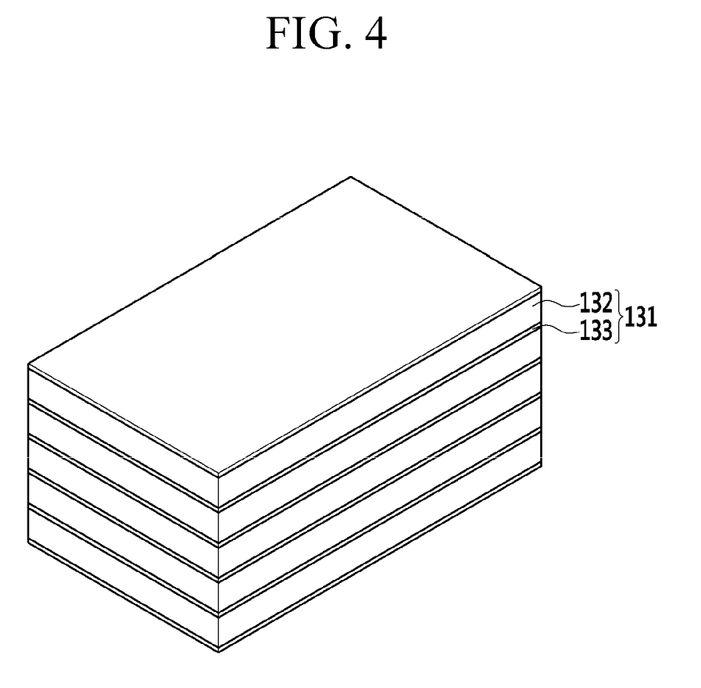
FIG. 4 is a view showing a state in which light transmitting layers and reflecting layers are stacked.
Figure 5:
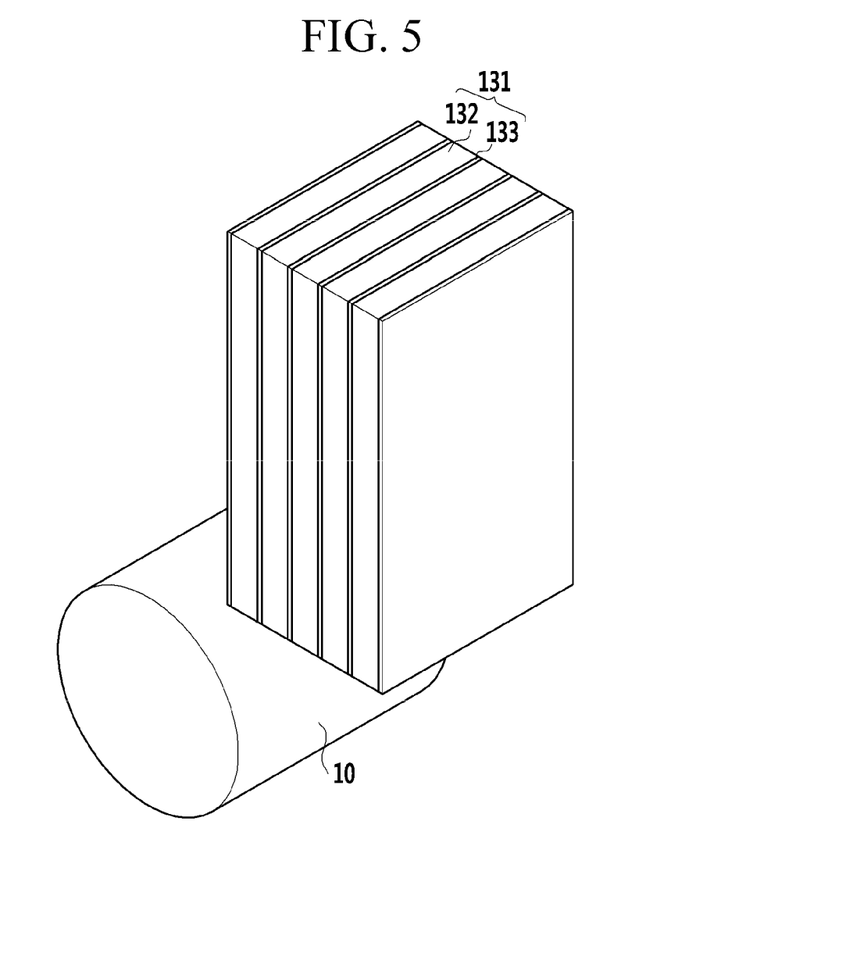
FIG. 5 is a view showing a process of polishing the stacked light transmitting layers and reflecting layers using a polishing machine.

FIGS. 4 to 6 are views showing an example of a method of manufacturing the light guide member shown in FIG. 2.

FIG. 4 is a view showing a state in which light transmitting layers and reflecting layers are stacked.

As shown in FIG. 4, the light transmitting layer 132 and the reflecting layer 133 are stacked to manufacture the light guide layer 131, and several light guide layers 131 are stacked. The light guide layers 131 may adhere to each other by the second adhering layer 135, as described above. Alternatively, the light guide layers 131 may adhere to each other by applying a predetermined heat and pressure the stacked light guide layers 131 by way of example. However, an adhesion method between the light guide layers 131 is not limited to the above-described methods.

FIG. 5 is a view showing a process of polishing the stacked light transmitting layers and reflecting layers using a polishing machine.

As shown in FIG. 5, one side of the stack of light guide layers 131 is polished using a polishing machine 10. The polishing machine 10 may have a circular shape. One side of the stack of light guide layers 131 may be formed so as to be recessed in an arc shape by the polishing machine 10 having the circular shape. Here, a radius of the polishing machine 10 may be equal to a radius of curvature of the curved surface part 110a of the panel assembly 110.

FIG. 6 is a view showing the light guide member polished and completely processed by the polishing machine.

As shown in FIG. 6, manufacture of the light guide member 130 may be finally completed. The light guide member 130 as described above is coupled to the panel assembly 110 (See FIG. 2), thereby manufacturing the tiled display 100 (See FIG. 2) according to an exemplary embodiment of the present system and method.

Meanwhile, returning to FIG. 2, the unit display unit 101 included in the tiled display 100 according to an exemplary embodiment of the present system and method may include a window member 140.

The window member 140 may be disposed in a transparent plate shape, and cover parts other than the curved surface part 110a in the panel assembly 110. The light guide members 130 may be disposed at both ends of the panel assembly 110, and the window member 140 may be mounted at a central portion of the panel assembly 110. That is, the window member 140 may be mounted on the upper surface of the panel assembly 110, such as shown in FIG. 2.

The window member 140 as described above may be, for example, a member having a transparent plate shape. The window member 140 may protect the panel assembly 110 from outside contact.

Meanwhile, the window member 140 and the light transmitting member 120 may be coupled to each other by forming a groove in one side of the window member 140 and inserting a portion of the light transmitting member 120 into the groove by way of example. Alternatively, the window member 140 may be formed integrally with the light transmitting member 120.

Figure 7:
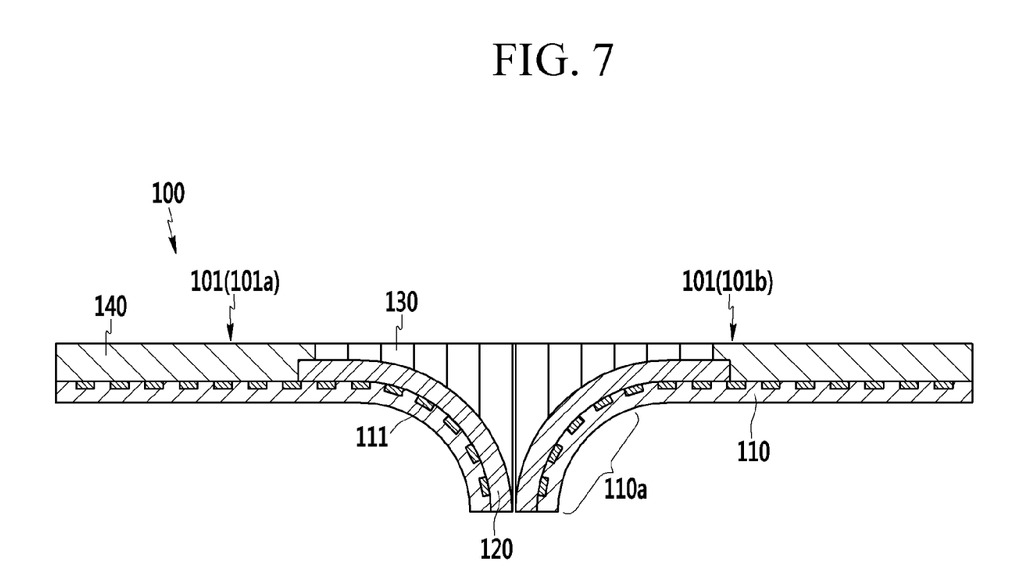
FIG. 7 is a view showing a state in which two panel assemblies closely adhere to each other.

FIG. 7 is a view showing a state in which two panel assemblies closely adhere to each other.

Referring to FIG. 7, in the tiled display 100 according to an exemplary embodiment of the present system and method having the above-mentioned structure, the image may be displayed from the curved surface part 110a to an end portion of the panel assembly 110, and the image display from the curved surface part 110a of the panel assembly 110 may be output to an upper surface of the unit display unit 101 along the light guide member 130. Therefore, the image may be displayed to the entirety of the upper surface of the unit display unit 101.

Therefore, in the case in which two adjacent unit display units 101a and 101b closely adhere to each other, visibility of a bezel is minimized, and as a result, the adjacent unit display units 101a and 101b may appear as one panel.

Furthermore, in the tiled display 100 according to an exemplary embodiment of the present system and method, because visibility of the bezel is minimized, the quality of the displayed image by the tiled display is improved.

While present system and method have been described in connection with exemplary embodiments, the present system and method are not limited to the disclosed embodiments. On the contrary, the present system and method cover various modifications and equivalent arrangements included within the spirit and scope of the appended claims. Therefore, those of ordinary skill in the art would appreciate that various modifications and other equivalent exemplary embodiments may be made from the present system and method. Therefore, the technical protection scope of the present system and method is to be defined by the claims.

What is claimed is:

1. A tiled display comprising:
a plurality of unit display units,
wherein each of the unit display units includes:
    a panel assembly including a curved surface part of which both ends are curved surfaces;
    a light transmitting member disposed in a transparent plate shape and covering the curved surface part of the panel assembly; and
    a light guide member including a recess part recessed at one side thereof where the light guide member is combined with the light transmitting member, positioned adjacent to the curved surface part of the panel assembly, and positioned toward a direction in which an image is displayed from the panel assembly.

2. The tiled display of claim 1, wherein:
the light guide member has a plurality of light guide layers stacked therein,
each of the light guide layers including:
a light transmitting layer transferring light output from the panel assembly; and
a reflecting layer disposed on one surface of the light transmitting layer to reflect the light transferred by the light transmitting layer.

3. The tiled display of claim 2, wherein:
the light guide member includes a plurality of first adhering layers interposed between the light transmitting layer and the reflecting layer.

4. The tiled display of claim 2, wherein:
the light guide member includes a plurality of second adhering layers interposed between two light guide layers adjacent to each other among the plurality of light guide layers to adhere the plurality of light guide layers to each other.

5. The tiled display of claim 2, wherein:
the panel assembly includes a plurality of pixels, and
a thickness of the light transmitting layer corresponds to a width of a pixel.

6. The tiled display of claim 5, wherein:
the plurality of pixels are disposed on the curved surface part of the panel assembly.

7. The tiled display of claim 2, wherein:
each of the plurality of light guide layers has one end positioned adjacent to a pixel of the panel assembly and another end directed toward the direction in which the image is displayed from the panel assembly.

8. The tiled display of claim 1, wherein:
a radius of curvature of the recess part is equal to a radius of the curved surface part of the tiled display.

9. The tiled display of claim 1, wherein:
the unit display unit further includes:
a window member disposed in the transparent plate shape and covering parts other than the curved surface part in the panel assembly.

* * * * *